M. O. CHRISTENSON.
NOISELESS GEAR WHEEL.
APPLICATION FILED APR. 17, 1922.

1,427,721.

Patented Aug. 29, 1922.

Martin O. Christenson
INVENTOR

BY Victor J. Evans
ATTORNEY

WITNESS:

UNITED STATES PATENT OFFICE.

MARTIN O. CHRISTENSON, OF MINNEAPOLIS, MINNESOTA.

NOISELESS GEAR WHEEL.

1,427,721.  Specification of Letters Patent.  Patented Aug. 29, 1922.

Application filed April 17, 1922. Serial No. 554,258.

*To all whom it may concern:*

Be it known that I, MARTIN O. CHRISTENSON, a citizen of the United States, residing at Minneapolis, in the county of Hennepin and State of Minnesota, have invented new and useful Improvements in Noiseless Gear Wheels, of which the following is a specification.

The object of this invention is to provide a gear wheel for use in all types of transmission gearing where the elimination of noise is a factor of importance.

A further object is to provide a gear wheel which will be more serviceable than a wheel made entirely of fiber or other similar material, and which will be maintained in practically the same condition indefinitely or as long as an all-metal wheel would ordinarily last under the conditions to which it is subjected.

A still further object is to provide a metallic rim portion having teeth formed thereon, a metallic hub, and an intermediate annular element for mounting the rim, this element being formed of fiber, or other suitable material.

A still further object is to provide particular means for retaining the fibrous element in position.

Figure 1:
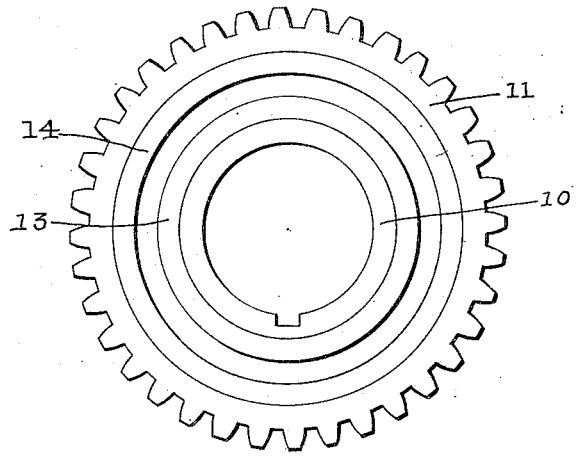
Figure 2:
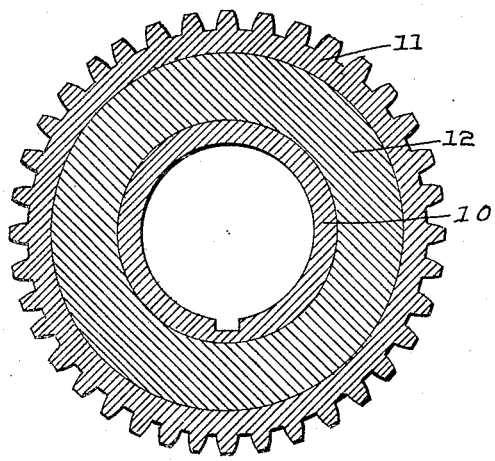
Figure 3:
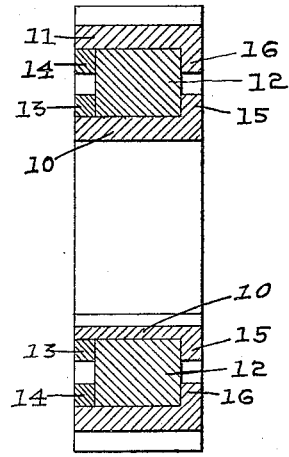

In the accompanying drawings, Figure 1 is a view of the gear wheel in side elevation; Figure 2 is a vertical section, transversely of the axis of rotation; Figure 3 is a vertical section, in the plane of the axis of rotation.

With the foregoing and other objects and advantages in view the invention consists in the novel construction and arrangement of elements described and claimed, it being understood that modifications may be made within the scope of the claims without departing from the spirit of the invention.

In carrying out the invention, I provide a metallic hub 10, a metallic rim 11, and an intermediate annular element 12, of fiber, or the like. The metallic elements may be of steel, iron, brass, or other metal or alloy.

A metallic ring 13 is pressed on the hub, and engages the edge portion of the fiber adjacent thereto. Another metallic element 14 is pressed into the rim 11 and engages the outer edge portion of the fibrous element 12.

Flanges 15 and 16 are provided respectively on elements 10 and 11, and engage the fiber on that side opposite to the side engaged by the rings 13 and 14.

The construction described practically eliminates vibration, and reduces the noise incident to high speed transmission.

Having thus described the invention, I claim:

1. In a gear wheel, a hub, a rim spaced from the hub and provided with teeth, an intermediate annular element engaging the hub and rim, and an annular element pressed over the hub, in intimate engagement therewith, and engaging the intermediate element.

2. In a gear wheel, a hub, a rim spaced from the hub and provided with teeth, an intermediate annular element engaging the hub and rim, and an annular element pressed over the hub, in intimate engagement therewith, and engaging the intermediate element, and a second annular element pressed into the rim and engaging the intermediate element.

3. In a gear wheel, a hub, a rim spaced from the hub and provided with teeth, an intermediate annular element engaging the hub and rim, and an annular element pressed over the hub, in intimate engagement therewith, and engaging the intermediate element, and a flange carried by the hub and engaging that side of the annular element opposite to that engaged by the element pressed over the hub.

4. In a gear wheel, a hub, a rim spaced from the hub and provided with teeth, an intermediate annular element of vibration reducing material engaging the hub and rim, and an annular element pressed over the hub, in intimate engagement therewith, and engaging the intermediate element.

5. In a gear wheel, a hub, a rim spaced from the hub and provided with teeth, an intermediate element of fibrous material engaging the hub and rim, and an annular element pressed over the hub, in intimate engagement therewith, and engaging the intermediate element, and a second annular element pressed into the rim and engaging the intermediate element.

6. In a gear wheel, a hub, a rim spaced from the hub and provided with teeth, an intermediate annular element engaging the hub and rim, and an annular element pressed over the hub, in intimate engagement therewith, and engaging the intermediate element, and a flange carried by the hub and engaging that side of the annular element opposite to that engaged by the element pressed over the hub, said intermediate element being of fibrous material.

MARTIN O. CHRISTENSON.